3,616,509
IN-LINE UNIT CARRIER LOADER
Albert W. Zemek and Stephen Gelo, Jr., Binghamton, and Robert H. Holmes, Marathon, N.Y., assignors to Universal Instruments Corporation, Binghamton, N.Y.
Filed Feb. 12, 1970, Ser. No. 10,719
Int. Cl. B23g 7/10; H01r 43/04; H05k 13/00
U.S. Cl. 29—203                                    29 Claims

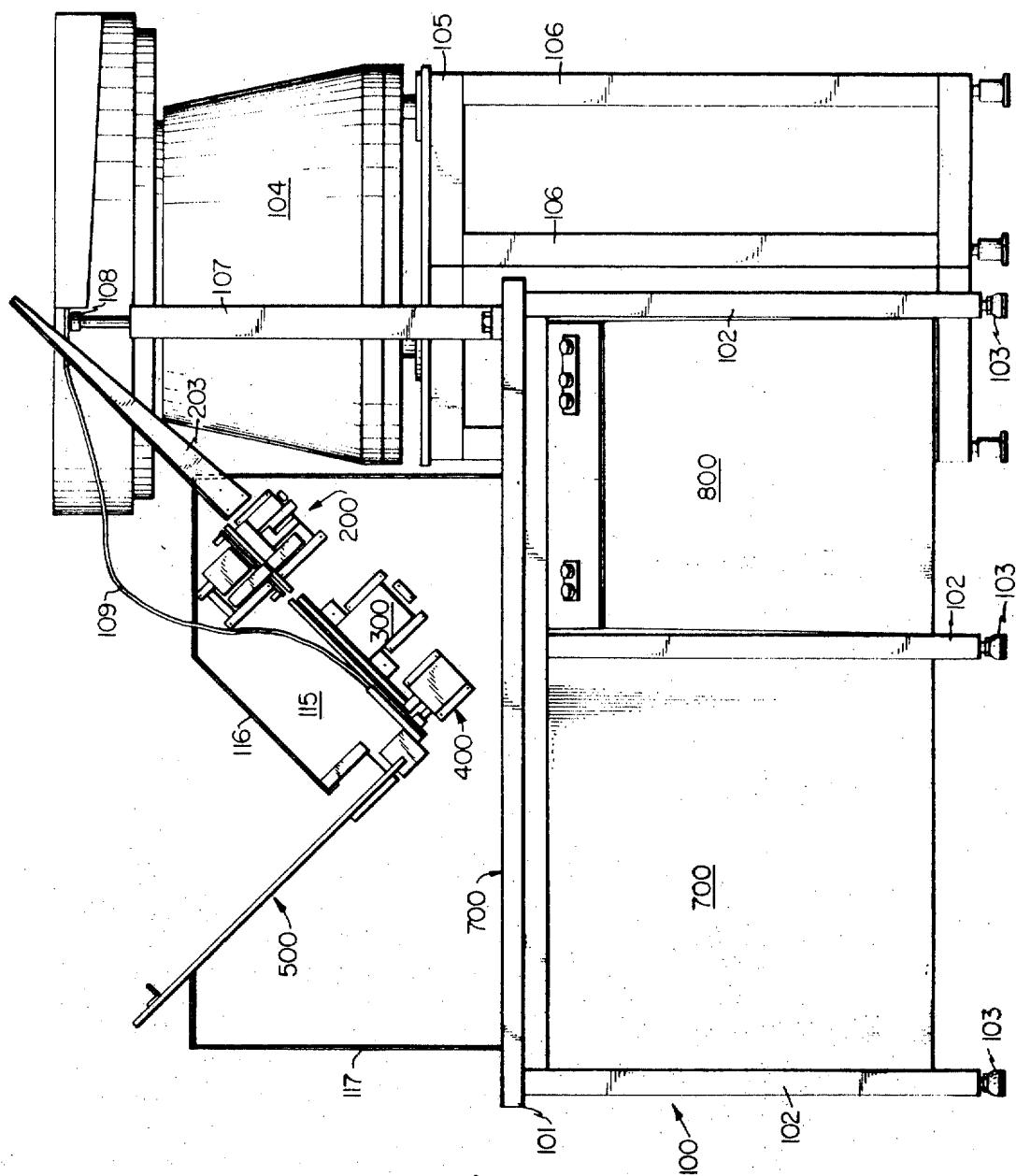

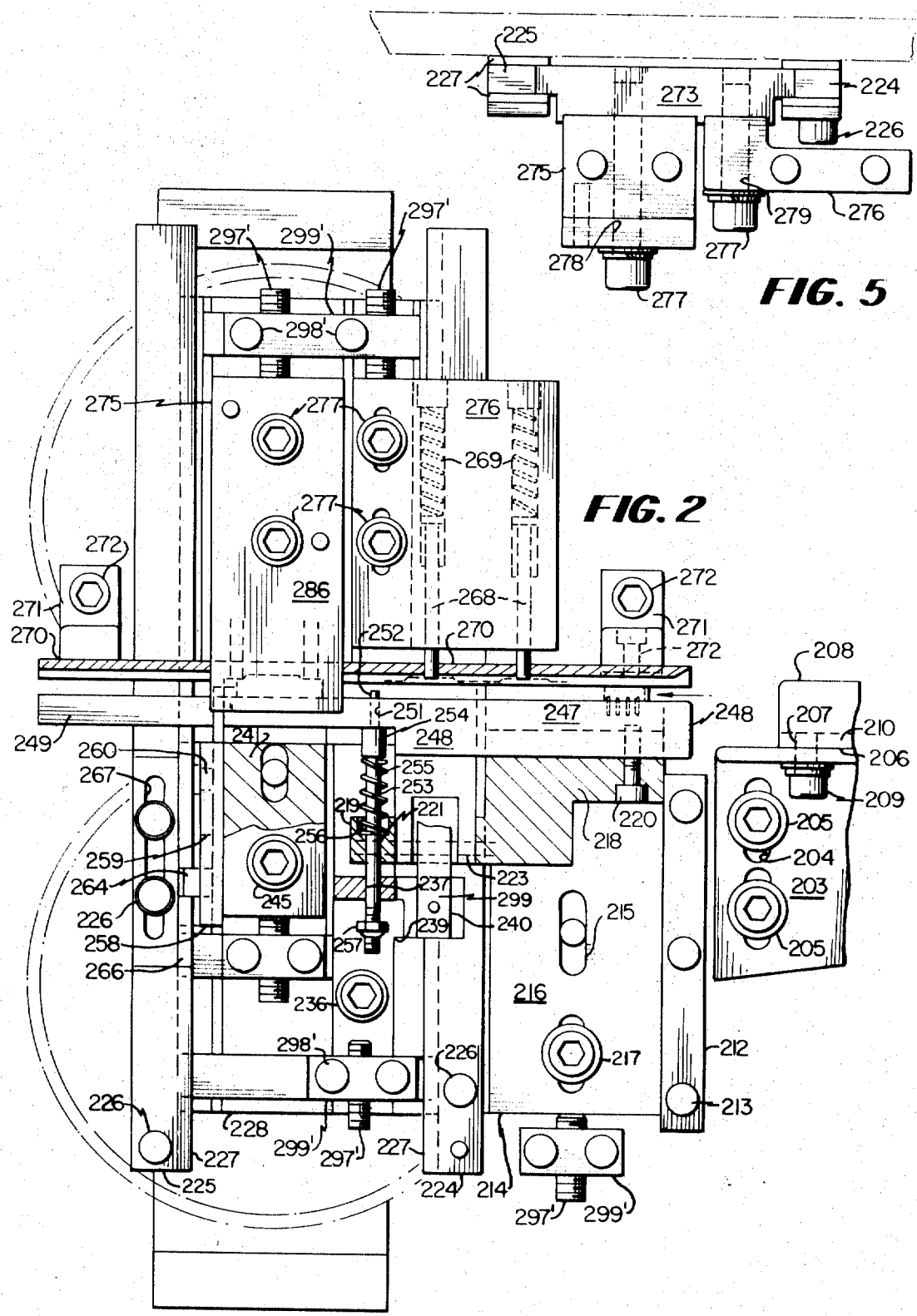

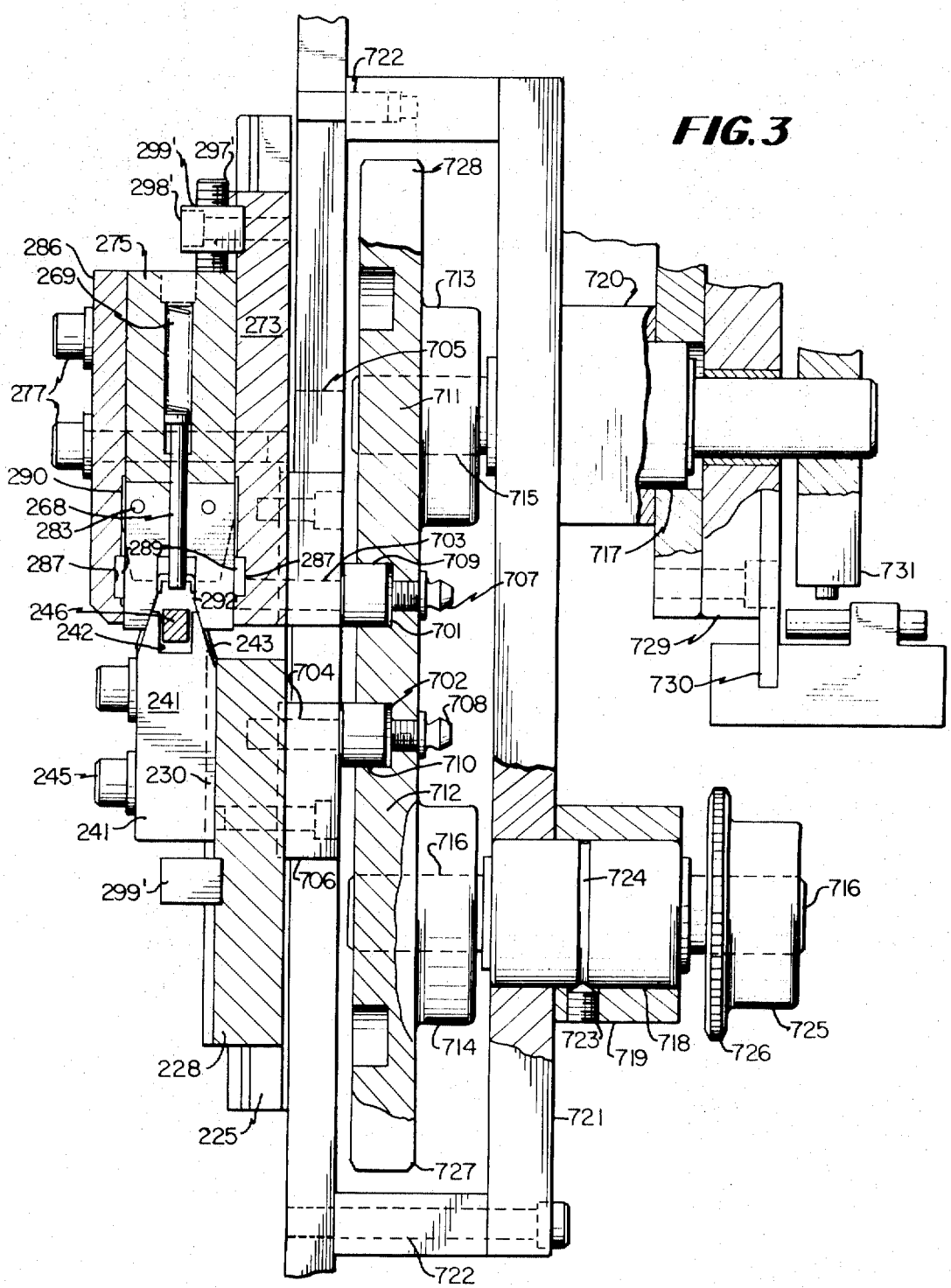

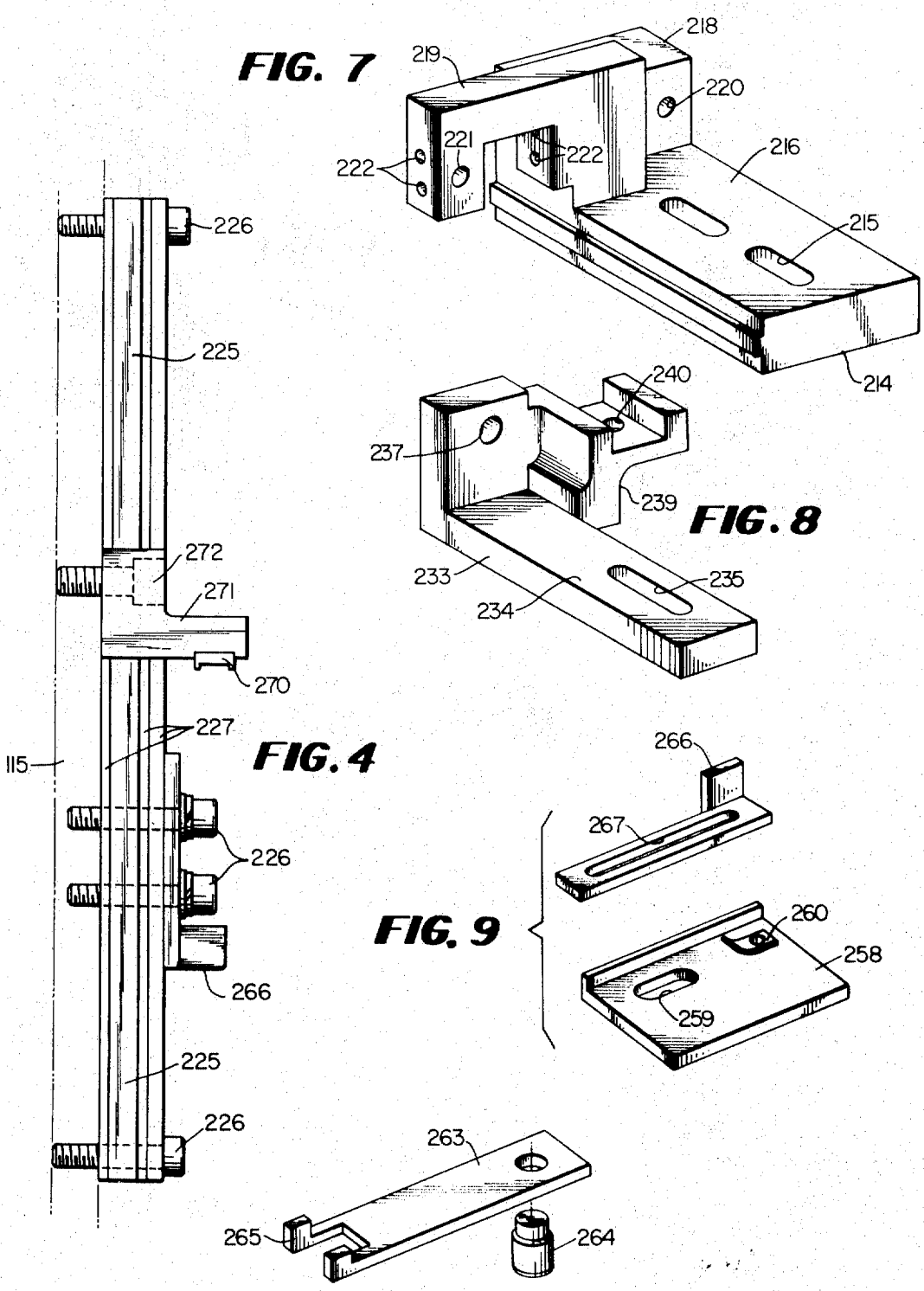

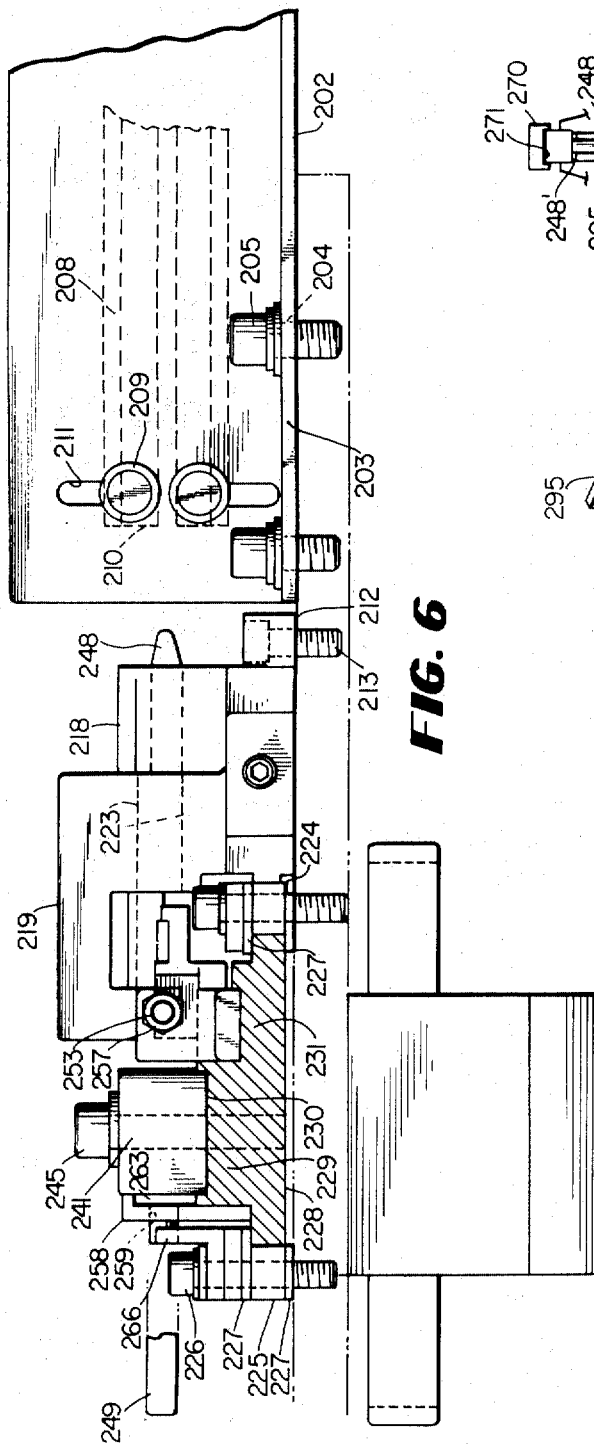
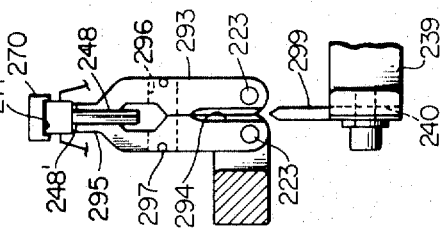
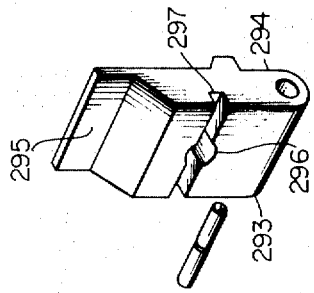
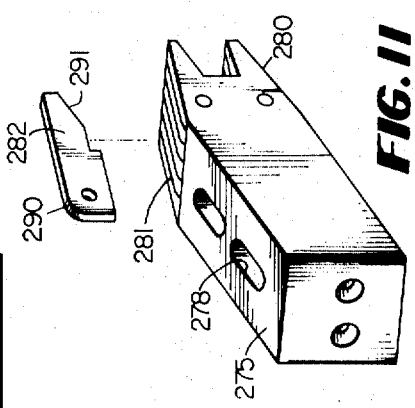

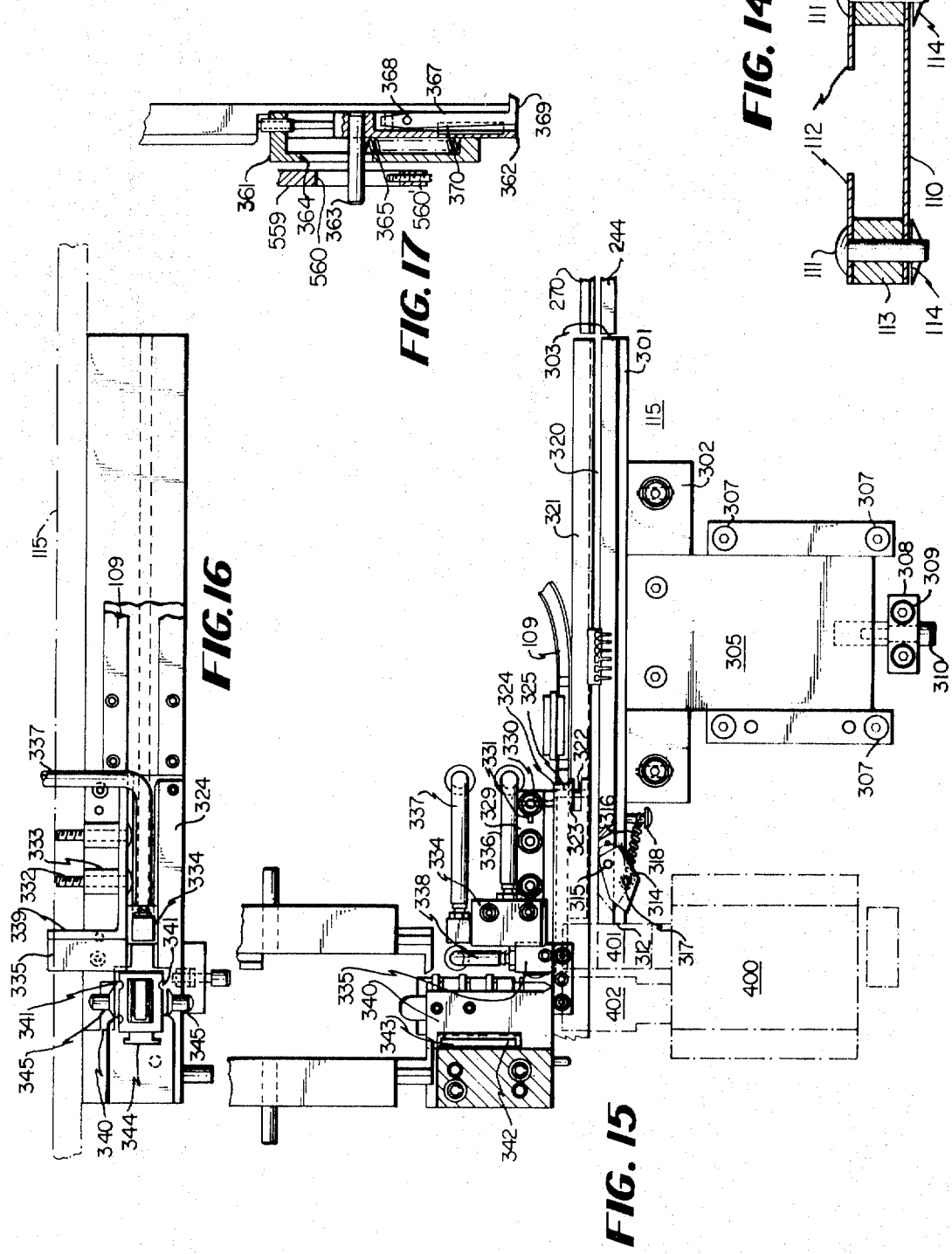

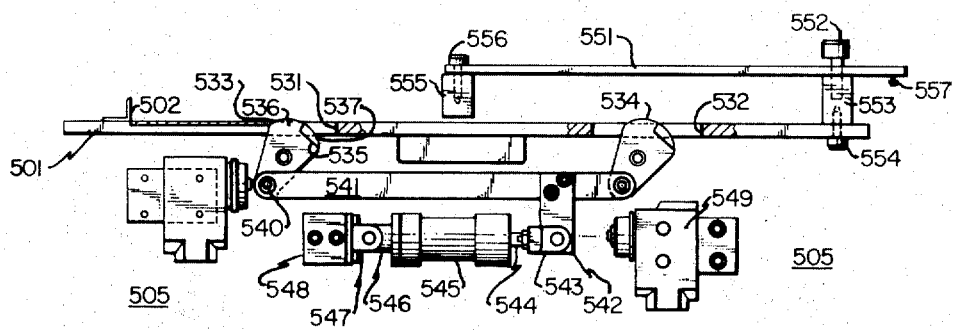
FIG. 22
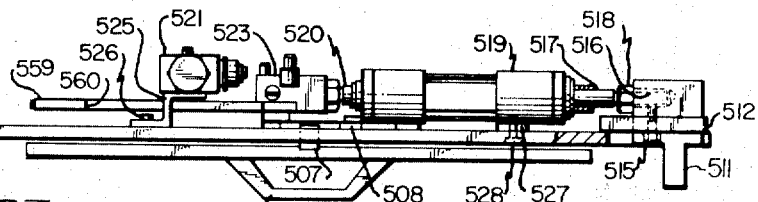
FIG. 23
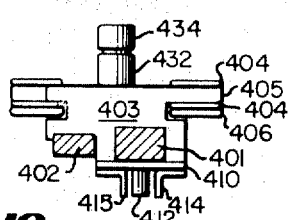
FIG. 19
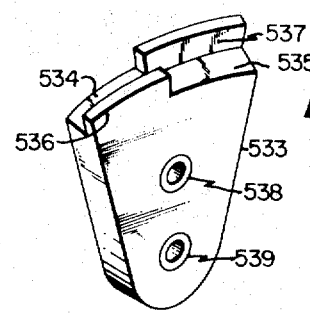
FIG. 24
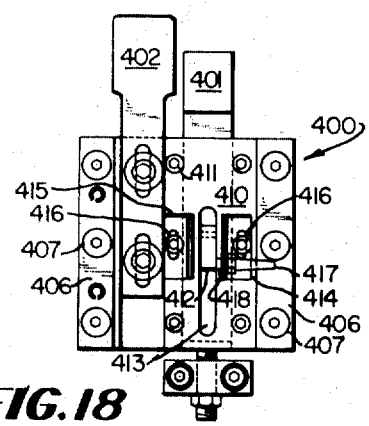
FIG. 18
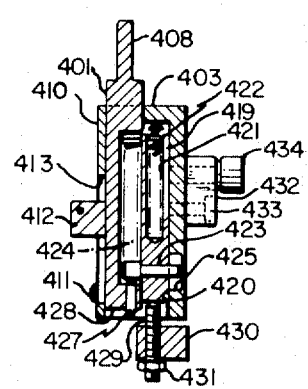
FIG. 20
FIG. 25

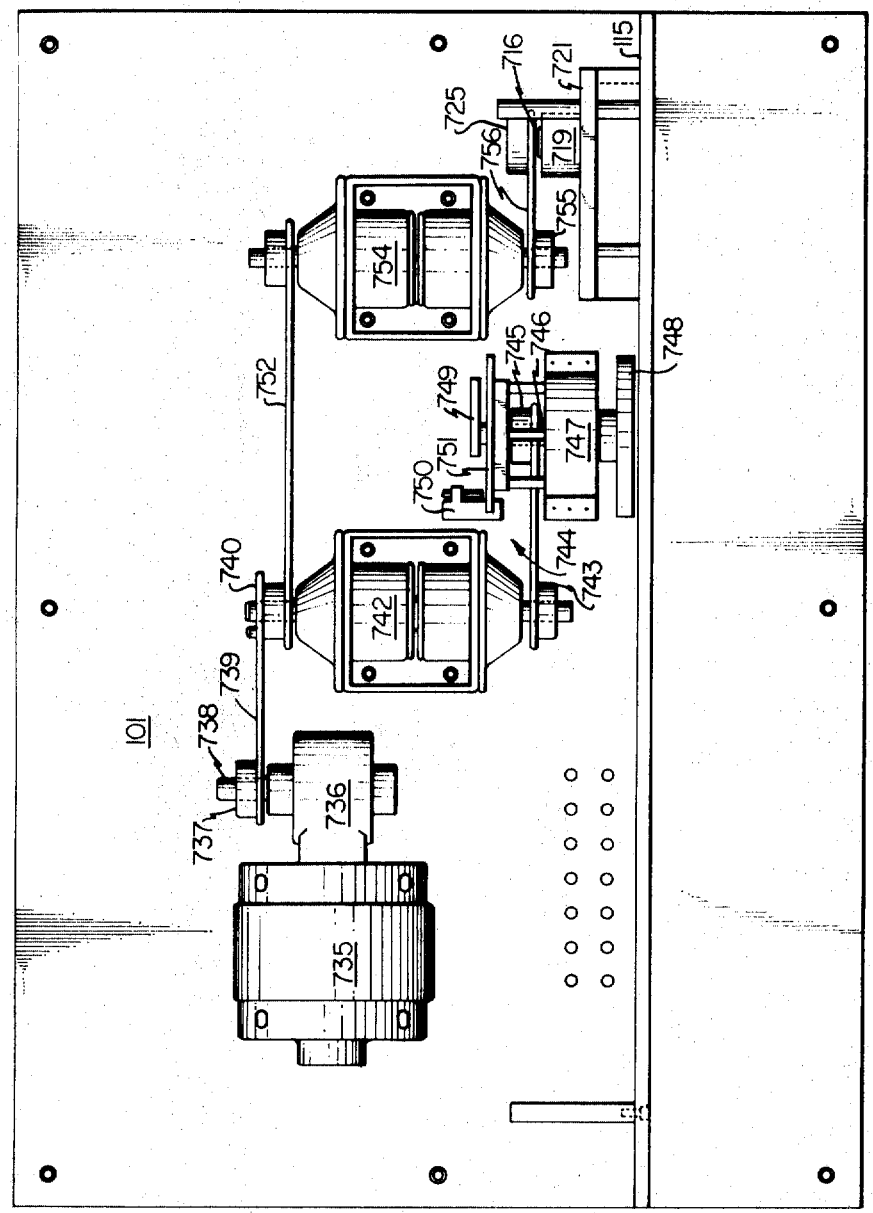
FIG. 26
FIG. 28
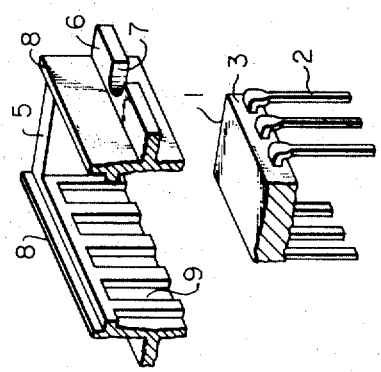
FIG. 30 ial Instruments Corporation, Binghamton, N.Y.

ABSTRACT OF THE DISCLOSURE

An apparatus for inserting dual in-line lead electrical components into unit carriers having a component supply, a component lead straightening assembly, a component escape mechanism which allows components to leave said straightening assembly and which aligns said components with a unit carrier for assembly, a component insertion assembly including an insertion head for loading components in unit carriers and a loading head for supplying loaded unit carriers to a magazine, and a magazine escape assembly to automatically supply a fresh magazine when another is filled with loaded unit carriers. The system is pneumatically controlled.

---

This invention relates to an automatic assembly apparatus for placing dual in-line package modules with leads extending from opposite sides thereof into unit carriers in a manner insuring proper alignment and loading the assembled combination into magazines.

Electrical components such as integrated circuits are commonly mass produced having a generally rectangular body with multiple leads extending from either side thereof. As shown in broken view in FIG. 30, such components have an elongated body 1 with leads 2 extending from the sides 3 thereof and bent to form two parallel sets of leads.

To handle such components, a unit carrier is employed which facilitates testing and handling of such components without subjecting the components to the possibility of damage to the body and leads or misalignment of the leads. The typical unit carrier is shown in broken cross-section in FIG. 30 as 5 and is generally rectangular and open at the top and bottom and having a flange 6 extending around the sides thereof with positioning notches 7. The long sides have flange portions 8 at the tops thereof enabling the carriers to be stacked. On the inner surfaces of the sides are slots 9 adapted to receive the leads 2 of the components upon pushing the component up into the carrier. A more detailed explanation of the components and carriers is found in copending application Ser. No. 761,229, filed Sept. 20, 1968, by Daniel W. Ackerman, now Pat. No. 3,564,691, granted Feb. 23, 1971.

One of the problems encountered in using unit carriers to handle components has been that of inserting the components into the carriers. Prior to this invention, insertion was performed by hand or with clumsy and awkward hand tools. Often the component was not correctly placed in the carrier or else the leads were not formed properly resulting in a high rate of rejections at a testing station or damage to the component and the inserting machine when the component is plunged into a circuit board. Also, the rate of insertion by previously known methods was too time consuming resulting in a slow production rate of loaded carriers. Further, testing for alignment of the component and its body after insertion created slower production rates. Thus, industry needed an apparatus capable of making a perfect insertion that would practically insure that the component would be inserted correctly into a unit carrier and that the component leads would be parallel.

The subject matter of this application is related to the subject matter of an application for a United States Letters Pat. Ser. No. 803,524, filed Feb. 7, 1969, now Pat. No. 3,570,099, granted Mar. 16, 1971, entitled "Unit Carrier Loader," assigned to Universal Instruments Corporation, the assignee of the instant invention and the contents of Ser. No. 803,524, is hereby incorporated into this application by reference thereto.

It is a general object of the present invention to provide a machine that will meet all of the above desiderata.

A more specific object of the present invention is to provide a machine for accurately inserting electrical components into unit carriers.

Another object of the present invention is the provision of a machine to form and straighten leads on an electrical component having leads extending from both sides thereof in a generally parallel direction, and insert said components into unit carriers.

A further object of the present invention is to provide a machine for inserting unit carriers loaded with electrical components into magazines to be used directly on insertion machines.

A still further object of the present invention is to provide a unit carrier loader having work stations aligned along one surface thereof to accept components, form and straighten the leads of said components, insert the components into unit carriers and insert the loaded carrier into magazines.

Other objects and the nature and advantages of the present invention will be apparent from the following description taken in conjunction with the accompanying drawings, wherein:

FIG. 1 is a front view of the entire assembly including all the various subassemblies;

FIG. 2 is a front view of the component lead straightening assembly showing some parts in section for the sake of clarity;

FIG. 3 is a right side view of the assembly of FIG. 2 showing some parts in section for the sake of clarity;

FIG. 4 is a partial left side view of the assembly of FIG. 2;

FIG. 5 is a plan view of the assembly of FIG. 2;

FIG. 6 is a bottom view of the assembly of FIG. 2;

FIG. 7 is a perspective view of the retainer block;

FIG. 8 is a perspective view of the actuator block;

FIG. 9 is a perspective view of the retainer plate and stop;

FIG. 10 is a perspective view of the slide stop;

FIG. 11 is a perspective view of the punch holder;

FIG. 12 is a perspective view of one of the lead forming flippers;

FIG. 13 is a partial broken-away view of the lead forming flippers and the relationship between them, the rail and the actuator blade;

FIG. 14 is a cross-sectional view of the unit carrier conveyer;

FIG. 15 is a front view of the escape assembly;

FIG. 16 is a plan view of the assembly of FIG. 15;

FIG. 17 is a front view of the carrier holders and guides;

FIG. 18 is a front view of the inserter assembly;

FIG. 19 is a plan view of the assembly of FIG. 18;

FIG. 20 is a side view of the assembly of FIG. 18;

FIG. 22 is a left-side view of the assembly shown in FIG. 21;

FIG. 23 is a right-side view of the assembly of FIG. 21;

FIG. 24 is a perspective view of an indexing flipper;

FIG. 25 is a partial view of the flipper interrelationship with two magazines;

FIG. 26 is a plan view of the drive assembly showing the drive molar and cam assemblies;

FIG. 28 is a time chart showing the operation of the pneumatic control system for the magazine escape assembly;

FIG. 30 is a perspective view of a sample component and unit carrier.

MAIN HOUSING 100

Figure 21:
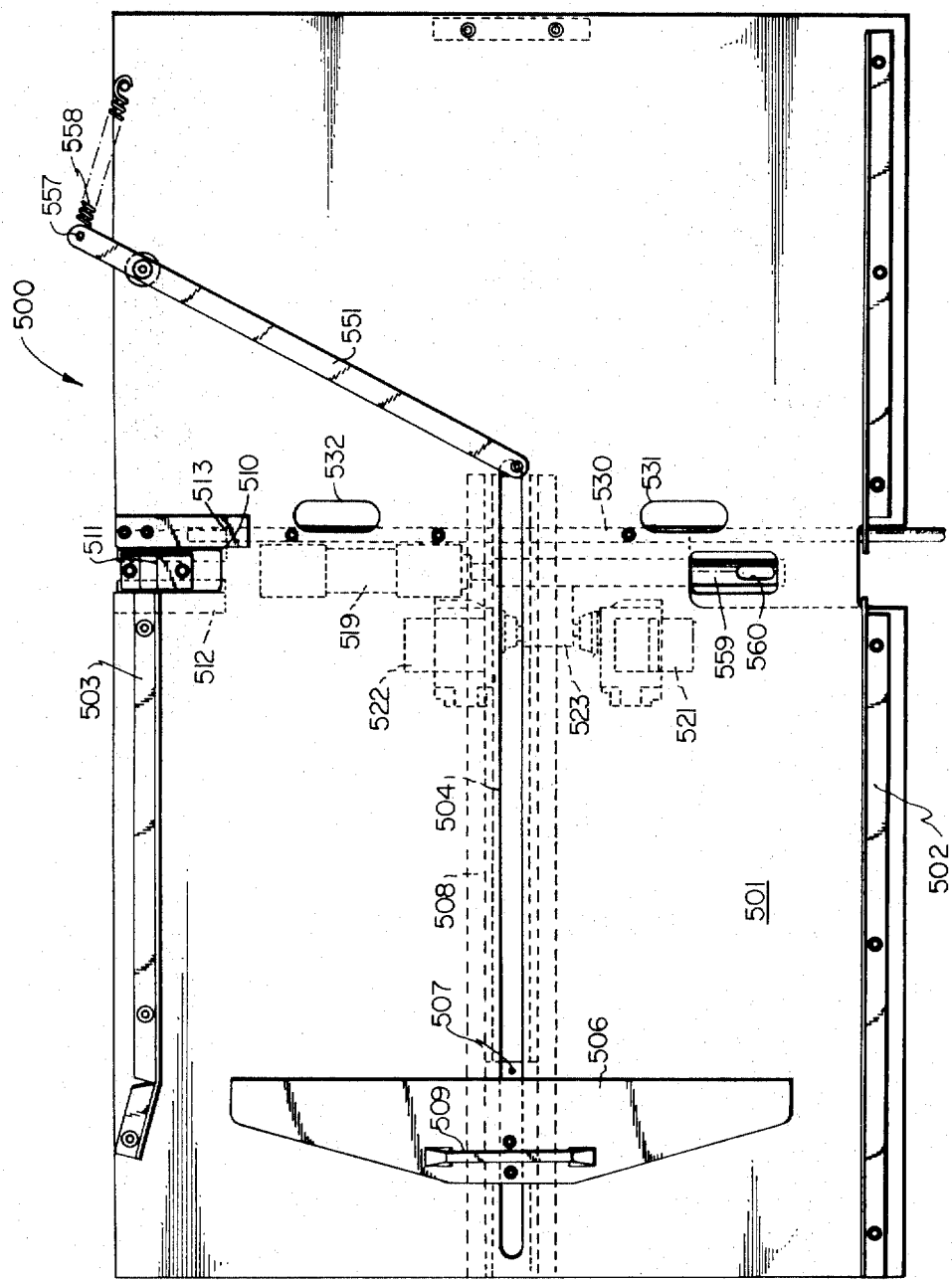
FIG. 21 is a plan view of the magazine escape assembly

Referring now to FIG. 1, there is shown the main housing and assembly designated as 100. A base 101 is supported on legs 102 and floor supports 103. A pneumatic assembly 700 is supported between two legs 103 and a push button and control panel assembly 800 is supported between the other two legs 103.

A vibratory bowl feed 104 is mounted on base 105 which is supported by legs 106.

A bracket 107 rising from base 101 mounts a track support block 108 adjacent the vibratory bowl 104. A bowl feed conveyer 109 (FIG. 14) drops from bowl feed 104 to the operative loader assembly. The conveyer 109 compresses a lower support band 110 which is secured as by rivets 111 to upper rails 112. Spacer blades 113 separate the rails 112 from support 110. Retaining rigs 114 hold the rivets 111 in engagement. A magazine support member leads down to a DIP lead straightening assembly 200 mounted on wall 115 of housing 116. Directly below the assembly 200 is escape assembly 300 and inserter assembly 400. A drive assembly 500 is in back of wall 115. DIPs are fed from inserter assembly to a magazine escape assembly 600 supported on housing 117. Barnes carriers are fed down conveyer 109 where they are held while DIPs are inserted therein.

DIP LEAD STRAIGHTENING ASSEMBLY 200

Referring now to FIGS. 2–13 there is disclosed the DIP lead straightening assembly generally designated as 200. The whole assembly is fastened to wall 115 of housing 100.

A support 202 consists of L-shaped member having a flange portion 203 with slots 204 therein. A plurality of bolts 205 secure the flange to wall 115 of main housing 100. Portion 206, perpendicular to flange 203, has a series of holes 207 therein. Locating members 208 are secured to portion 206 by machine screws 209 coming up through the slots 211 in the bottom of portion and received within threaded holes in a flange 210 on each member 208. Locating members 208 support a DIP support bar (not shown) which is adapted to receive DIPs from a magazine.

Mounted adjacent support 202 on wall 115 is a rectangular guide bar 212 secured thereto by machine screws 213 or the like. Mounted adjacent guide bar 212 and abutting it is a retainer block 214. Slots 215 on a flange portion 216 of retainer block 214 receive machine screws 217 which attach block 214 to wall 115 of housing 100. Referring to FIG. 7, it is seen that retainer block 214 has flange portion 216, raised portion 218 on one end thereof and an inverted C-shaped section 219 adjacent portion 218. Portion has an aperture which receives a rail securing screw 220. The end of the C-shaped section 219 has an aperture 221 for receiving a DIP stop rod to be later described. A pair of apertures 222 in both extensions of the C-shaped section receive wiper pivot pins 223.

Mounted adjacent block 214 is a die slide holder 224 which is similar in construction to a second die slide holder 225. Bolts 226 secure holders 224 and 225 and spacer members 227 to the wall.

Held in sliding relationship between members 224 and 225 is slide 228. As seen in FIG. 6, slide 228 has a raised portion 229 providing a die receiving notch 230. Another lesser raised portion 231 provides a surface 232 for receiving an actuator block 233.

As seen in FIG. 8, actuator block 233 has a flange portion 234 with an adjustment slot 235 therein. A bolt 236 passes through slot 235 to secure block 233 to slide 228. A raised portion 236 on one end thereof has an aperture 237 for receiving a DIP stop rod, later described. Projecting section 238 contains a notch 239 with a threaded hole 240 therein.

Mounted in notch 230 of slide 228 is die 241. Die 241 has a rail receiving notch 242 in its front surface. The front top and bottom surfaces of die 241 are tapered and grooved to provide DIP lead engaging grooves 243. Grooves 243 engage the underside of the DIP leads. Die 241 has two adjustment slots 244 therein to receive machine screws 245 or the like, which secure die 241 to slide 228.

A DIP rail 246 is secured to retainer block by rail securement screw 220. Rail 246 is elongated and has a deep portion 247 which has a tapered DIP receiving edge 248, a reduced portion 249 on which the straightened DIPs leave the straightening assembly 200. The center area of rail 246 is relieved on both sides thereof as at 280 in order to receive the front and rear wiper elements, seen in FIG. 13. The rail has an aperture 251 which receives the DIP stop pin 252 of the DIP stop rod 253. A collar 254 is attached to the rod 253 adjacent the pin. A compression spring 255 is received on rod 253 between collar 254 and a bored portion 256 of hole 221 in section 219 of retainer block 214. Rod 253 passes through hole 221 and hole 237 in actuator block 233 and is threaded on its end to receive an adjustment nut 257.

Referring to FIG. 6, mounted by any suitable means on the side of raised portion 229 of slide 228 is a retainer plate 258. It is generally L-shaped and has a slot 259, and an aperture 260 in the side thereof.

A screw 261 secures a flat spring 262 to the inner surface of retainer plate 258. A slide stop 263 slides between slide 228 and retaining plate 258. Slide stop 263 has a stud 264 therein which is adapted to slide in slot 259, and has a slotted end 265 which is adapted to surround rail portion 249 and prevent a DIP from escaping down the rail. A stop member 266 is mounted adjacent plate 258 and is secured to holder 225 by screws 226 passing through a slot 267 and into member 225.

The spring 262 maintains plate 258 and slide stop 263 in light engagement. When slide 228 begins its rearward movement, stud 264 is in the rear of slot 259. The portion 265 withdraws from each side of the rail portion 249 sufficiently to allow a DIP to escape. Stud 264 hits stop member 266, thus stopping any further downward movement of slide stop 263. The slide continues its rearward movement, thus stud member 264 now moves to the upper position in slot 259. The slide now moves forward a bit and maintains this position until the next DIP is in position. However, this forward motion moves portion 265 of slide stop 263 into holding position again on rail portion 249. When the DIP is in position, being held by portion 265, the slide begins its forward movement to carry the die 241 into engagement with the DIP leads.

Mounted on top of rail is a guide member 270 having a groove 271 which fits around the top of the DIP body. Member 270 is secured to wall 115 by means of L-shaped brackets 271 and machine screws 272.

Slide holding members 224 and 225 extend under rail 246 and are adapted on the top side thereof to receive punch slide 273. Again, bolts 226 and spacers 227 retain the slide in position. A notch 274 in punch slide 273 receives punch holder 275 and stinger block 276. Screws 277 hold both of these members to slide 273, passing through slots 278 in punch holder 275 and slots 279 in stinger block 276.

The front of punch block is tapered as at 280 (see FIG. 11) and slotted as at 281. Slots 281 receive punch blades 282 which are held therein by dowels 283 passing through holes 284 in punch block 275 and hole 285 in blades 282. The number of blades and slots vary depending on the particular DIP being worked, but usually there are 14 or 16 blades in the holder. As seen in FIG. 3, there is a cover plate 286 held on top of block 275 by screws 277 which has a relieved area 287. A similar area 288 is found in slide 273. In each of the areas is received a resilient pad 289 of plastic or like material. As will be noted from inspection of FIG. 3, the areas in slide 273 and cover 286 are slightly relieved. When the blades 282 are in place, the top edges 290 thereof ride in these slightly reduced areas. When edges 290 engage the pads 289, the blades 282 are forced inwardly where the tapered inner edges 292 thereof force the DIP leads into the grooves 243 of die 241, thus straightening and aligning them.

Alternatively solid punch blocks are used with the blades being integrally cut into the blocks.

Referring to FIG. 12, there is shown a wiper 293, it being understood that a second wiper which is a mirror image of wiper 293 is provided as shown in FIG. 13. Wiper 293 has relieved areas 294 on one side thereof, a wiping portion 295, an aperture 296 and a slot 297. A spring pin 298 is received in slot 297 and is adapted to receive one end of a tension spring (not shown) which maintains the wipers together. The top of portion 295 fits into relieved area 248 of rail 246 and under a small flange 248'.

Notch 240 in actuator block receives an actuator blade 299 having a beveled edge 201 which is adapted to be driven between the wipers adjacent their pivot points on dowel 223 and to thus separate the portions 295 which move outwardly from under flange portions 248' to force the leads of a DIP outwardly. The DIP is held in position during this operation by a stinger rod 268 biased into holding engagement with the DIP by a compression spring 269.

One other stinger 268 is received in stinger block 276 and two more are received in punch 275. The latter stingers hold each end of a DIP, as indicated by the phantom lines, which the leads are being straightened.

Mounted on the rear of slides 273 and 228 are screw blocks 299' held in place by machine screws 298'. An adjustment screw 297' is mounted in each of these blocks and serves merely to hold all the components, moving and stationary, as in the case of retainer block 214, in place.

The DIPs slide down until it is engaged by the forward portion 247 of the rail. It continues to slide until the first stinger rod 268 engages it and holds it in place. During the next operational cycle it slides down until it hits stop pin 251 and is held there in the second stinger. Actuator blade 299 then forces wipers 293 apart to bend the DIP leads outwardly. During the next operational cycle, the DIP slides down until it hits portion 265 of stop slide 263. The two stingers in the punch holder engage it, the die grooves 280 come up underneath the leads and the punch blades are forced down over the leads by pads 289 and force the leads into alignment in grooves 280 of die 241. On the next cycle, the DIP is released.

ESCAPE ASSEMBLY 300

Referring now to FIGS. 16 and 17, there is shown the DIP escape assembly 30. A guide 301 begins adjacent reduced portion 249 of rail 246. Guide 301 is composed of an L-shaped bracket member 302 and a rail section 303 attached thereto by machine screws 304 or the like. Member 302 is secured to a pusher 305 which is mounted for sliding movement between giles 306 which are attached to wall 115 by screws 307. A screw block 308 is attached to wall 115 by screws 309. A screw 310 secures a stud 311 thereto for providing a stop for pusher 305.

The end of guide 301 terminates in flat surface 312. A cut-out area 313 receives flipper 314 which is pivoted on pin 315. A compression spring 316 biases flipper 314 between pin 317 on flipper 314 and screw 318 mounted on another portion of the assembly. When pusher 305 is in the retracted position as shown in FIG. 15 and slot 320 is aligned with the slot between member 270 and rail portion 249, a corner 319 of flipper 314 is in position to stop a DIP coming down the slot 320. When guide 301 is raised slightly, the slot 320 is no longer aligned with the slot between member 270 and rail portion 249, and flipper 314 is in position to allow a DIP to slide down slot 320. A notched bar section 321 forms slot 320 with guide 301 and has a projecting portion 322 which is received in a slot 333 of escapement 324. A pin 325 retains portion 322 in slot 323. The bottom surface of escapement 324 forms to top of slot 320 above flipper 314. The end of slot 320 merges with the top of inserter 401.

Conveyer 109 abuts engagement 324, and members 326 and 327 form together with escapement 324 a chute for unloaded carriers. Escapement 324 is notched as at 328 to allow for upward mount of inserter 401 when pushing a DIP up into an unloaded carrier directly above. Located in a strap 329 is a pivoted stop member 330 with a stop pin 331. Strap member is secured to wall 115 by screws 332 and spacers 333. Mounted also on strap 329 are proximity switches 334 and 335. They are connected via pneumatic hoses 336, 337, and 338 to the pneumatic control system and the air cylinders. Proximity switch 334 senses the presence of a carrier in the loading position while proximity switch 335 senses a loaded carrier in the loading chute 340.

Chute 340 has projections 341 for engaging the notches on the flange of the loaded carrier. As shown in FIG. 15, a spring 342 biases a pusher 343 against the sides of loaded carriers in slot 344 of chute 340. Guides 345 are located on each side of chute 340.

Rail extensions (not shown) hold the loaded carriers when they enter the bottom of the chute.

Referring now to FIG. 17, there is shown a carrier holding mechanism 360 consisting of a holder 361, an eject block 362 and a driving dowel 363. Dowel 363 rides in a slot 364 in holder 361 and is biased in an upward position by compression spring 365. A relieved area 366 in eject block 362 receives latch 367 which pivots on pin 368. Latch 367 has an L-shaped carrier engaging portion 369 and is biased outwardly in spring 370. A screw 371 limits the amount of biasing. A similar mechanism 360', the minor usage of 360, is juxtapositioned to 360.

INSERTER ASSEMBLY 400

Referring to FIGS. 18, 19 and 20, there is shown an inserter assembly 400. It consists of an inserter 401 and a pusher 402 mounted for movement on a slide 403. Slide 403 is mounted for sliding movement between wear plates 404 and is held in place by gibs 405, and backing plates 406. The plates 404 and 406 and gibs 405 are held by machine screws 407 or the like.

Inserter 401 has a reduced portion 408 adapted to engage the bottom of a component. A cover plate 410 is secured to the top of slide 403 by machine screws 411. Mounted on the top of inserter 401 is an air sensor 412 which rides in a slot 413 in cover 410. Two L-shaped members 414 and 415 are mounted on cover plate by screws 416. Member 414 receives an air fitting 417 having an air sensor outlet 418 immediately adjacent air sensor 412. The purpose of the sensor is to pick up a malfunction in the operation of the device. A second slide 419 is mounted under inserter 401 in an open area 420. Received in a bored passage 421 is a compression spring 422 which biases the slide 419 backward. A machine screw 423 is mounted in slide 419 and the top thereof rides in a relieved area 424 in the bottom of inserter 401 and the end in a slot 425 in the base of slide 403. A compression spring 426 biases screw 423 toward the rear of slide 403. An adjustment set screw 427 in a flange portion 428 of inserter 401 is used to adjust the uppermost travel of 401 and an adjustment screw 429 mounted in set block 430 determine the amount of movement of inserter 401 relative to slide 403 and the bottommost travel of 401. A jam nut 431 holds adjustment screw 429 in place.

Mounted on the base of slide 403 by screws 433 and movable in a slot (not shown) in wall 115 is a standoff 432. A cam follower 434 is mounted in the stand-off 432. The follower 434 rides in a cam groove in a disc (not shown).

The inserter 401 is trust upwardly by the action of the bottom of slot 425 hitting screws 423 and spring 424 forcing 401 upwardly. When 403 moves, slide 419 is allowed to move backward until the end of slot 425 hits screw 423 and 401 is given an upward thrust by screw 423 suddenly thrusting against compression spring 424. On retraction, everything comes back as a unit, 419 hits set screw 429 and 401 stops. Slide 403 overrides by the action of spring 422.

Both 401 and 402 move together when 403 is activated. Inserter 401 forces the component resting on the top surface thereof up into an unloaded carrier while pusher 402 pushes against the bottom of a loaded component to force it up into chute 340.

MAGAZINE ESCAPE ASSEMBLY 500

Referring now to FIGS. 21–25, there is shown a magazine escape assembly 500. Generally, it consists of a magazine plate 501 having a lower bracket 502 and an upper bracket 503. A slot 504 extends across a majority of the plate. A brace 505 supports the plate 501. Mounted in slot 504 is a pusher 506 connected via a spacer 507 to a retainer 508. A handle 509 is used to move the pusher in the slot.

Empty magazines are stacked vertically adjacent each other on the plate with the last empty one aligned with notch 510 at the top of the plate. Riding in notch 510 is a pusher 511 mounted between two giles 512 and 513 and secured to knuckle 514 by screws 515. An aperture 516 receives the threaded end of a piston rod 517 and a jam nut 518. Piston rod 517 is connected to an air cylinder 519 which is a double-acting piston. On the other end of the piston, a piston rod 520 which has an actuator 523 on the end thereof for engaging either of two microswitches, 521 and 522, which are mounted to plate 501 by brackets 525 and screws 526.

Brackets 527 and screws 528 secure cylinder 519 to plate 501. A bar 529 is attached to the actuator member 523 and extends downwardly therefrom. Secured to the underside of plate 501 is a rail 530 which engages a portion of escape assembly 300 to align the plate therewith.

Adjacent rail 530 are two slots 531 and 532. Mounted under said slots and partially protruding therethrough are pivoted flippers 533 and 534, which are pivoted about their center portions. In FIG. 24, there is shown flipper 533 which is pie-shaped and has two cut-away segments on the circumference thereof, 534 and 535. The two raised portions 536 and 537 engage the underside edges of magazines to move them laterally. The thickness of a magazine side edge and an abutting magazine side edge will pass between the portions 536 and 537. The flipper 533 is pivoted as at 538 and has an aperture 539 at the base thereof for receiving a pin 540 which connects it with link 541. A bar 542 connects link 541 with a clevis 543 on the end of a piston rod 544. The other end of piston rod 544 connects with cylinder 545 which, in turn, is connected via bracket 546 and clevis 547 to mounting block 548. A microswitch 549 is adapted to be actuated by bar 542 when cylinder 545 is activated. A second microswitch 550 is activated by engagement by link 541.

Mounted on plate 501 is biasing arm 551 for maintaining the loaded magazines in an upright position. Arm 551 is fastened by screw 552 to pivot 553 which, in turn, is secured to plate 501 by machine screw 554 or the like. The magazine engaging end of arm 551 has a roller 555 secured thereto by screw 556. The opposite end of arm 551 has a bottom member 557 which is engaged by an extension spring 558, which is attached to plate 501 by any suitable means. The arm, then, is biased against the loaded magazines by spring 558.

Extending from actuator 523 is bar 559 having a slot 560 on one end thereof. The length of slot is adjustable by turning a set screw 560'. Dowel 363 of guide 360 engages in slot 560 so that upon the upward stroke of cylinder 519, latch 369 and the magazine are pulled upward.

At the same time that pusher 511 jams an empty magazine down, bar 559 is thrust downwardly and latch members 369, 369' are positioned to point directly over the four to five loaded carriers, thus locking the magazine in place on bayonet portions 340' on the top of chute 340.

As shown in FIG. 25, the magazines 370 have an H-cross section. The flippers 534 and 533, (534 being shown) act to allow the magazines to be shifted laterally upon actuation of cylinder 545. When the flipper is in the position, portion 536 is engaging the inside of flange 371 of magazine 370. When cylinder 545 is activated, the flipper pivots and the magazine moves in the direction shown until flange 373 of magazine 372 abuts portion 537 of flipper 533. The same action takes place in regard to flipper 534. Thus, the magazines are shifted one-half of the way. Then cylinder 545 retracts and the magazine shifts the remaining one-half of the way. Cylinder 545 stays in this position until a magazine is loaded, whereupon cylinder 545 is again activated, allowing another magazine to slide into place.

As shown in FIG. 21, magazines move from right to left and are forced in this direction by biased arm 551 and roller 555.

A proximity switch (not shown) resides above and down from pusher 511 and senses when a loaded carrier is underneath, whereupon it gives the signal to activate cylinder 519 to pull arm 559 upwards, thus pulling the loaded magazine away from chute 340 by the latch members 369, 369'. This action also activates solenoid 522 which, in turn, activates piston 545. The flippers pivot and the loaded magazine slides out of place, and an unloaded one slides into place.

PNEUMATIC CONTROL ASSEMBLY 600

Figure 29:
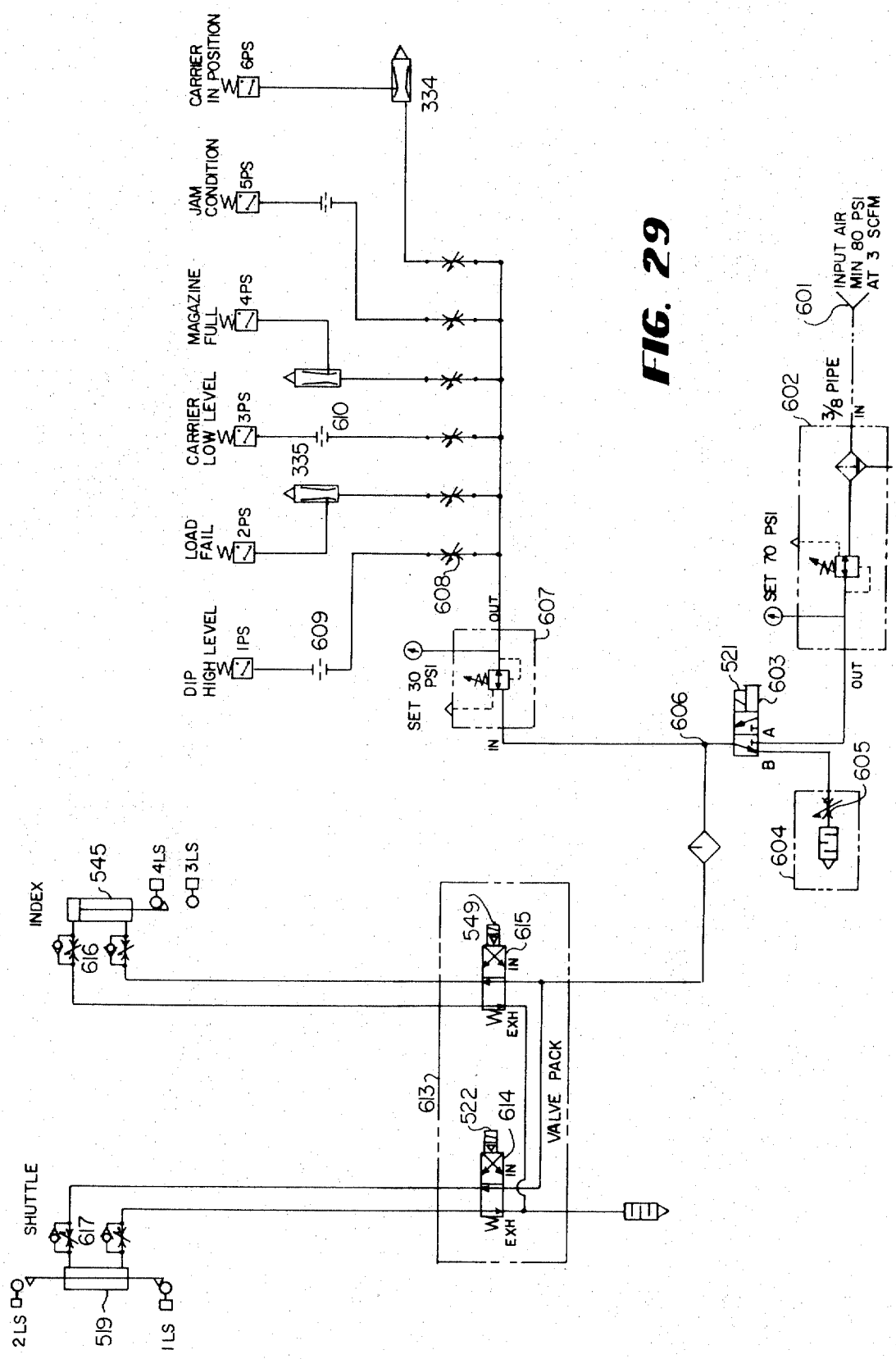
FIG. 29 is a diagram of the pneumatic control assembly.

Referring now to FIG. 29, there is shown the pneumatic schematic for the operation of the magazine escape assembly 500.

Pressurized air is introduced into the system at 601 and passes through a filter regulator 602 and continues onto a three-way valve 603. Solenoid 521 operates valve 603. A line extends from valve 603 through a reducing nipple 605 and to speed control muffler 609. The main line extends from valve 603 through a three-way fitting 606 to a regulator 607. Regulator 607 is connected via several branch lines to pressure sensors 1–6. In all cases, needle valves 608 are used; and in the case of pressure sensors 2, 4 and 6, the pressure sensors are activated by proximity switches. In the case of pressure sensor 4, it is activated by the proximity switch (not shown) which is mounted above pusher 511. In the case of pressure sensors 2 and 6, they are activated by proximity switches 335 and 334, respectively. Pressure sensors 1, 2 and 6 operate to stop the motor if a carrier is not in position or if a load failure occurs.

The remaining pressure sensors operate to shut off the motor if switches 609, 610 or 612 are activated by a DIP high-level condition, a carrier low-level condition or a jam condition.

Extending from T-connection 606, a line connects with valve pack 613 which contains two four-way valves, 614 and 615, each coupled to two solenoids 522 and 549. Lines from valve 615 extend through flow control valves 616 to cylinder 545, and lines extend from valve 614 to cylinder 519. The operation of the cylinders actuate limit switches 1–4.

The operation of the system begins by energizing the drive motor by any suitable switching means. Fifty loaded carriers are loaded into a magazine whereupon pressure sensor 4 stops the drive motor. Solenoid 522 energizes shifting shuttle cylinder 519 up, pulling the loaded magazine out of chute 340 and limit switch 2. Limit switch 2 energizes solenoid 549 extending indexing cylinder 545, which starts to move an empty magazine into position, and activating limit switch 3. Limit switch 3 de-energizes solenoid 549 causing cylinder 545 to retract making limit switch 4 and placing the unloaded magazine in line with chute 340. Limit switch 4 de-energizes solenoid 522 shifting shuttle cylinder 519 down. which activates limit switch 1, which restarts the drive motor.

FIG. 28 shows the cycle time in seconds of the operation of the magazine escape assembly.

POWER ASSEMBLY 700

Referring to FIGS. 3 and 6, it is seen that there are cam followers 701, 702 mounted by rods 703, 704, respectively, on member 273 and 228. Spacers 705 and 706 support followers 701, 702 out from said members. The followers 701, 702 ride in cam grooves 709, 710 in cams 711, 712, respectively. Grease fitting 707, 708 are fitted on the back side of the cam grooves for lubrication purposes. Each cam 711, 712 has a flanged section 713, 714, respectively, which receives bearing shafts 715, 716, respectively. Bearing shafts 715, 716 have enlarged bearing portions 717, 718 which are mounted in cylindrical portions 719, 720 of bearing support 721. Bearing support member 721 is mounted to wall 115 by means of long machine screws 722, or the like. Set screws 723, engage notches, such as 724, in bearing portions 717, 718 to maintain the bearings and shafts in position. A sprocket 725 is mounted on the end of shaft 716 and receives a chain (not shown) on a toothed portion 726. Cam 712 drives cam 711 by engagement of their respective toothed perimeter surfaces 727, 728.

Shaft 717 rotates within two parts of hub 729 carrying a timing assembly support plate 730 and a proximity switch member 731. A timing assembly 732 is mounted on plate 730, which does not rotate.

Referring to FIG. 26, the drive mechanism is seen mounted on base 101.

Figure 27:
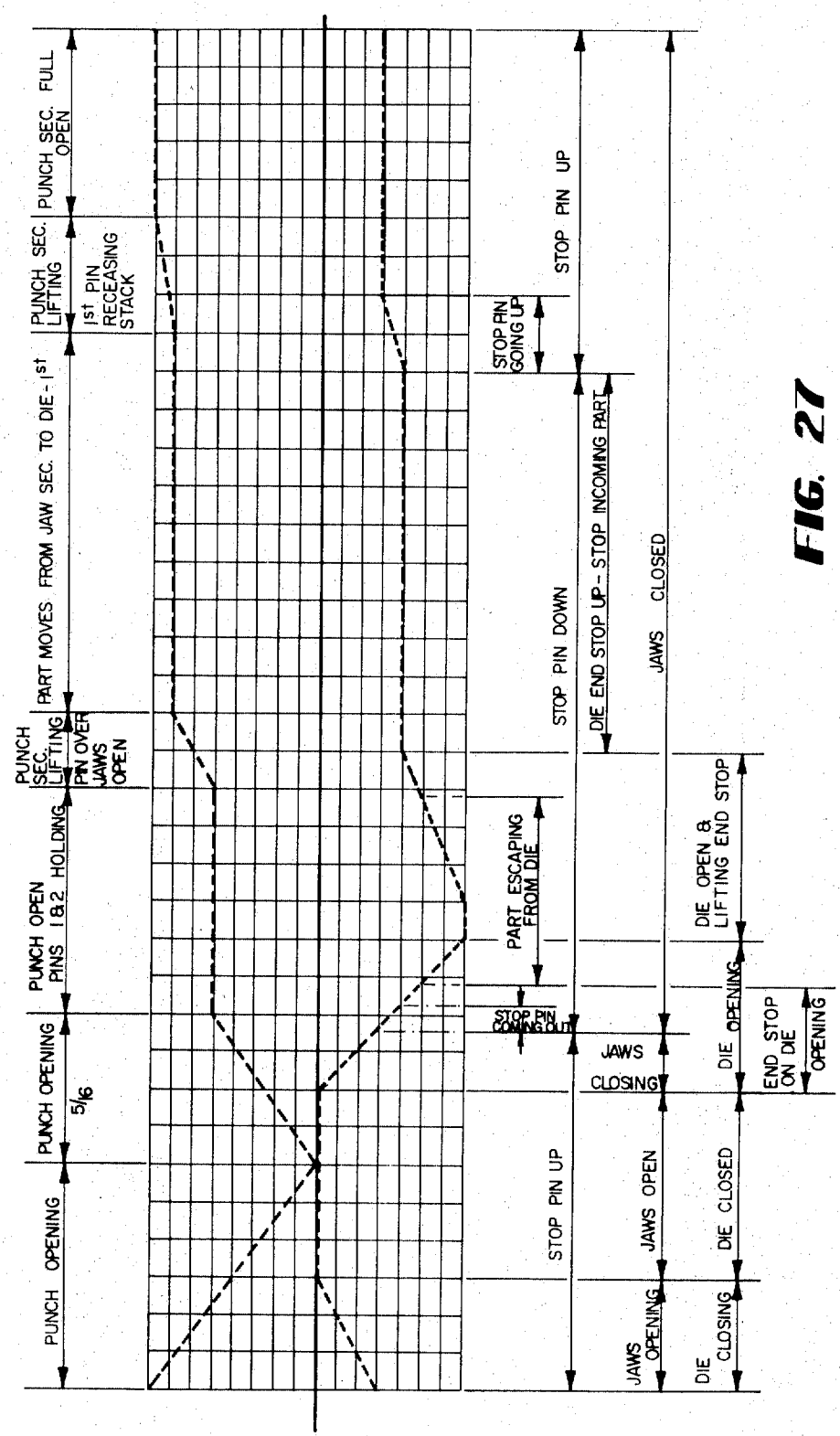
FIG. 27 is a timing chart showing the operation of the punch and die.

A Bodine motor 735 drives through a right-angle reduction gear 736 which drives a sprocket 737 mounted in shaft 738. A chain 739 translates the power to sprocket 740 mounted on a shaft 741 of Electro-Pack 742. A sprocket 743 on the other end of shaft 741 engages a chain 744 which drives a sprocket 745 on cam bearing shaft 746 mounted in housing 747. On one end of shaft 746 is a cam 748. The other end of the shaft carries a proximity switch member 749 which trips a timing assembly 750 on plate 751 which is mounted on housing 752. Cam 748 is adapted to cam follower 434 (FIG. 3) which, through a connecting member (not shown), also drives pusher 305 of the escape assembly. A chain 752 is also driven off of sprocket 740 and engages sprocket 753 of Electro-Pack 754. A sprocket 755 on the other end of 754 drives a chain 756 which engages sprocket 725 (FIG. 3) on shaft 716 to drive the straightening mechanism 200. The cam grooves are not concentric with the cams but have dwell sections, activating sections and de-activating sections. FIG. 27 shows the operation of the component lead straightening assembly on a cam chart measuring degrees of rotation of the cam versus the increments, in inches, of the movement of the punch and die, with explanations concerning the movement of the stingers, stop pin and flippers. The chart is self-explanatory, and no further discussion of it is deemed necessary.

OPERATION

The operation of the apparatus is as follows. A magazine containing unprocessed components is mounted on the member 203, and the vibratory bowl is filled with empty unit carriers. A vibrator motor (not shown) is started on carriers which proceed down the conveyor 109 and into escapement 324 where they are stopped by stop 330.

The components are allowed to slide down from the magazine until they come to rest against stop 252. The motor is started and flippers 293, 295 force the leads of the lead component outwardly. Slide 273 withdraws, stingers 268 lift, stop 251 and the first component slide down until they hit portions 265 of stop 263 where they stop. Die 241 comes up under the leads and punch holder 275 moves down, and the punch blades are pivoted inwardly through the action of resilient pads 287 and force the leads down into grooves 243 of the die 241.

Stop 263 withdraws and the component slides down portion 249 of rail 246 until it abuts against the end 303 of rail 301. The pusher 305 is activated, the rail moves and the component slides down the rail until it hits flipper 314. Further movement of rail 301 allows the component to slide onto the inserting surface of insertion head 401.

At this time, stop 331 is activated which allows an empty carrier to slide down escapement 330 until it is directly over a component.

Insertion head 401 then comes up, forcing the component into a unit carrier. The head withdraws, the loaded carrier is transferred to a position over pusher 402, whereupon it is inserted up into chute 340.

After four to five loaded carriers have been inserted into chute 340, an empty magazine is positioned over them by pusher 511. The magazine is filled and when full, is pulled up by dowels 360, slot 560 and bar 559. While an empty magazine is being substituted, four to five loaded carriers are thrust into chute 340, and the operation continues.

Having described the invention, it will be apparent to those skilled in the art that various changes and modifications may be made therein without departing from the scope of the invention as defined by the appended claims.

We claim:

1. An apparatus for inserting electrical components having leads into unit carriers comprising, a frame means, a component receiving means, a plurality of work stations adjacent said receiving means, at least one of said work stations including means for straightening leads of a component positioned therein, said straightening means including means to initially bend the leads of said components outwardly prior to straightening thereof, a unit carrier conveying means adapted to deliver unit carriers at the point of said work stations, said work stations means including means to position a unit carrier above a component and means to insert said component into said unit carrier, and means to move said components through said work stations.

2. An apparatus as in claim 1 wherein said straightening means includes slidably converging punch holder and die means, said die means having grooves therein adapted to receive the leads of said components and said punch holder means have a plurality of integral punch blades therein which are adapted to force said component leads into the grooves of said die means.

3. An apparatus as in claim 1 wherein said means to position a unit carrier above a component includes an escapement means to allow only one component and one unit carrier to be processed during an operational cycle of said apparatus, and said means to insert said components into said unnit carriers comprises a slidable insertion head which is adapted to engage the underside of a component body and force it up into a unit carrier.

4. An apparatus as in claim 3 wherein said escapement means comprises a movable rail section which is adapted to be selectively positioned so as to allow a component to be received therein, and a carrier receiving means adjacent said carrier conveying means and located above said movable rail section and having a pivoted stop means which is adapted to selectively allow a unit carrier to be positioned above a component received by said movable rail section.

5. An apparatus according to claim 3 wherein said slidable insertion head is slidably biased in a slide block and separate means are provided to adjust the upper extent of the travel of the travel head and the lower extent of said travel.

6. An apparatus as in claim 1 wherein there are two work stations, the first work station comprising means for straightening leads of a component and the second work station includes a component escapement means to allow one component at a time to be positioned during each operational cycle of said apparatus and a slidable insertion head which is adapted to engage the underside of said component body and force it up into a unit carrier.

7. An apparatus as in claim 6 wherein said straightening means includes means to initially bend the leads of said components outwardly prior to straightening thereof.

8. An apparatus as in claim 6 wherein said straightening means includes slidably converging punch and die means, said die means having grooves therein adapted to receive the leads of said components and said punch holder means having a plurality of pivotable punch blades therein which are adapted to force said component leads into the grooves of said die means.

9. An apparatus as in claim 6 wherein said component escapement means comprises a movable rail section which is adapted to be selectively positioned so as to allow a component to be received therein and a carrier receiving means adjacent said carrier conveying means and located above said movable rail section and having a pivoted stop means which is adapted to selectively allow a unit carrier to be positioned above a component received by said movable rail section.

10. An apparatus according to claim 6 wherein said slidable insertion head is slidably biased in a slide block, and separate means are provided to adjust the upper and lower extent of the travel of said slidable insertion head.

11. An apparatus for inserting electrical components having a series of in-line bent leads on either side thereof into unit carriers, said apparatus comprising:
 (a) a series of work stations;
 (b) a slide means adapted to receive components from a supply means and carry them through said work stations;
 (c) one of said work stations comprising a component lead straightening means;
 (d) unit carrier conveyer means;
 (e) a second of said work stations comprising an insertion means adapted to insert components into unit carriers;
 (f) a third of said work stations comprising a component and unit carrier escapement means adapted to position a component under a unit carrier in line with said insertion means,
whereby components are fed through said work stations and have their leads straightened, are positioned under a unit carrier and are inserted therein.

12. An apparatus as in claim 11 and including:
 (g) a magazine escapement means adapted to position empty magazines in place to receive loaded unit carriers; and
 (h) a pusher means adapted to force loaded unit carriers up into said empty magazines.

13. An apparatus as in claim 12 wherein said magazine escapement means includes:
 (i) a chute for receiving loaded unit carriers; and
 (j) a second pusher means to drive empty magazines down over said chute and to eject loaded magazines from the area over said chute; and
 (k) a magazine indexing means adapted to substitute an empty magazine for said loaded magazine after said loaded magazines have been ejected over said chute,
whereby said first pusher means is adapted to force loaded carriers into said chute during each operational cycle of said apparatus and said loaded carriers are gradually forced up into said magazine by each motion of said first pusher means.

14. An apparatus as in claim 13 wherein magazine indexing means comprises:
 (1) a pair of pivotable flipper elements having two arcuate offset projections adapted to substitute an empty magazine for a loaded magazine, the substitution occurring once for each operational cycle of said flipper elements.

15. An apparatus according to claim 11 wherein said lead straightening means comprises:
 (j) a slidable punch means; and
 (k) a slidable die means;
said punch and die means adapted to converge during an operational cycle of said apparatus to straighten component leads.

16. An apparatus as in claim 15 wherein said punch means comprises:
 (i) a punch holder;
 (j) two juxtapositional series of spaced punch blades pivotally mounted in said punch holder; and
 (h) resilient means adapted to bias said blades toward each other when said punch holder slides toward said die.

17. An apparatus according to claim 11 wherein said component and carrier escapement means comprises:
 (g) a slot means adapted to receive unit carriers from said unit carrier conveying means;
 (k) a stop means to selectively allow carriers into said slot means;
 (i) a movable rail means adapted to selectively allow components to be received thereon; and
 (j) abutment means at the end of said slot and said rail means to position a component under a unit carrier.

18. An apparatus according to claim 11 wherein said insertion means comprises:
 (g) a slide block; and
 (h) an insertion head member slidably biased in said slide block, and
 (i) means to adjust the length of the insertion head stroke whereby said length of travel of said insertion head is adjustable.

19. An apparatus according to claim 18 wherein said insertion means additionally comprises:
 (g) a magazine loading means attached to said slide block and adapted to eject loaded carriers into magazines.

20. In an apparatus for inserting dual in-line lead electrical components into unit carriers, a lead straightening assembly comprising a component supporting means, a punch means on one side of said supporting means, a die means on the other side of said supporting means, said punch and die means adapted to slidably converge on said component means to straighten the leads thereof.

21. An assembly as in claim 20 wherein said punch means comprises a slidable punch holder, a series of juxtapositioned spaced slots in the working end of said punch holder, a relieved area between said slotted areas adapted to receive a component body, a plurality of pivoted punch blades in each slot and resilient means adapted to force said blades to converge upon activation of said assembly.

22. An assembly as in claim 20 wherein said die means comprises a die block having juxtapositioned tapered grooves in the working end thereof, a relieved area intermediate said grooved portions, said grooves adapted to receive component leads during the straightened operation.

23. An assembly as in claim 20 wherein said assembly also includes a pair of pivoted flipper elements mounted adjacent said supporting means and said die means, means to activate said flipper elements to force them to pivot outwardly under a component and force the component leads outwardly, whereby said leads are prebent prior to straightening.

24. In an apparatus for inserting dual in-line lead electrical components into unit carriers, a magazine escape assembly comprising a magazine supporting means, an indexing means to move said magazine along said supporting means as each one is filled with loaded unit carriers, a magazine shuttle means to force an unloaded magazine received from said indexing means and position it to receive loaded unit carriers and to eject it from said position upon the magazine being filled.

25. An apparatus according to claim 24 wherein said indexing means comprises a biased arm which is adapted to bias empty magazines toward said shuttle means, and a pair of arcuate flipper elements having arcuate projections adapted to engage the bottom of said magazine to allow them to shift toward said shuttle means upon actuation.

26. An apparatus according to claim 24 wherein said shuttle means comprises a slidable pusher adapted to engage the top of an empty magazine and force it down into a loading area, and a pair of pivoted latches and ejection means adapted to force a loaded magazine from said loading area when said magazine is fully loaded.

27. In an apparatus for inserting dual in-line lead electrical components into unit carriers, a component insertion and carrier loading assembly comprising a carrier escapement means, a component escapement means, said carrier and component escapement means adapted to position a component directly under an unloaded carrier, an insertion head means positioned so as to be adapted to force said component up into said carrier, a pusher means, a loaded carrier storage means, said pusher means adapted to receive loaded carriers from said escapement means and force it up into said storage means.

28. An assembly according to claim 27 wherein said carrier escapement means comprises a slot mounted to receive empty carriers from said carrier conveying means and a pivotable stop means adapted to selectively allow carriers to enter said slot means.

29. An assembly as in claim 27 wherein said component escapement means comprises a movable rail section which is selectively movable in a direction perpendicular to the direction of travel of components being processed, said rail section adapted to have components slide thereon, and a flipper mounted in said rail section to prevent components from sliding to said insertion head means, a surface of which constitutes an extension of said rail section.

References Cited

UNITED STATES PATENTS

| 3,442,430 | 6/1969 | Ackerman et al. | 29—203 B |
| 3,545,064 | 12/1970 | Zemek et al. | 29—203 B |

THOMAS H. EAGER, Primary Examiner

U.S. Cl. X.R.

29—203 B, 203 D, 211